UNITED STATES PATENT OFFICE.

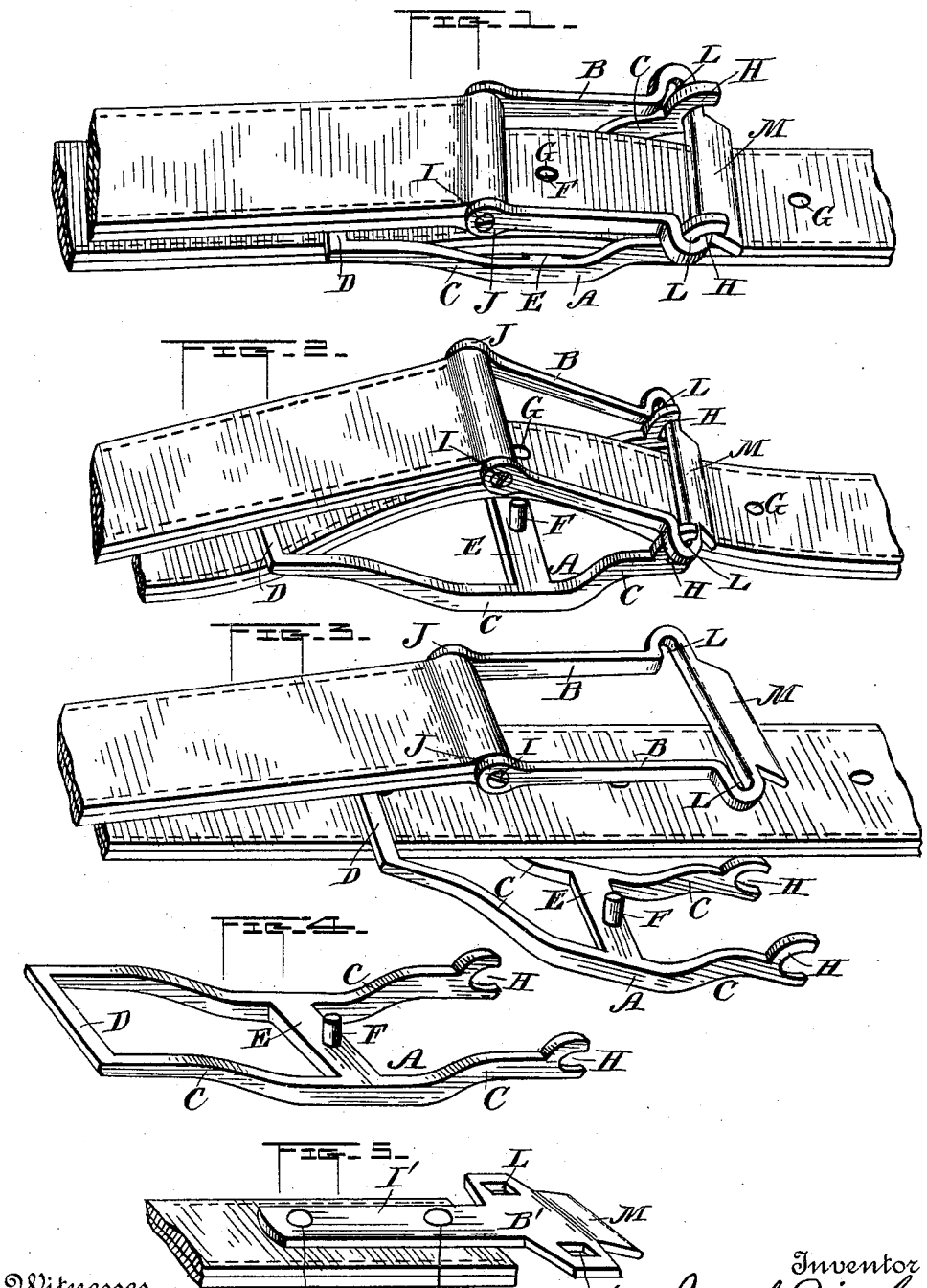

JACOB ZIEGLER, OF ARLINGTON, NEBRASKA.

BUCKLE.

SPECIFICATION forming part of Letters Patent No. 482,289, dated September 6, 1892.

Application filed June 25, 1892. Serial No. 437,982. (No model.)

*To all whom it may concern:*

Be it known that I, JACOB ZIEGLER, of Arlington, in the county of Washington and State of Nebraska, have invented certain new and useful Improvements in Buckles; and I do hereby declare the following to be a full, clear, and exact description of the invention, such as will enable others skilled in the art to which it appertains to make and use the same.

My invention relates to an improved construction of trace-buckle; and its object is to provide a simple, strong, and durable device whereby the two parts of a trace may be connected in such a manner as to permit of ready adjustment in the length of trace.

My invention more particularly resides in the novel combination, construction, and arrangement of parts hereinafter fully specified, and pointed out in the claim.

In the accompanying drawings, Figure 1 is a perspective view of my device holding two straps together. Fig. 2 is a perspective view of the under side of the device in the first stage of unbuckling. Fig. 3 is a perspective view showing the two parts unbuckled. Fig. 4 is a detail view of the loose part of the buckle, and Fig. 5 is a perspective view showing a modification of my device.

My improved form of buckle consists, essentially, of two parts—a loose frame-piece A and a clevis-shaped piece B, secured to an end of one part of the trace. The piece A is formed of two parallel side pieces C, curved as shown in Fig. 4, connected at one end by a cross-piece D and at or near the middle by a cross-piece E, which latter carries a projection F, adapted to enter one of the holes G in the trace or strap. The side pieces C terminate at their ends in forks or bearings H. The clevis-shaped piece B is attached to a trace-section by means of a pin I, passing through the eyes J at the open ends of the sides of the clevis and through a loop in the trace and secured by a nut screwed upon its end. The sides of the clevis at their other ends are bent first outwardly and then inwardly to form hooks or recesses L to receive the upper prongs of the forks H. The cross-piece K of the clevis has a flattened flange M having a downward inclination and bears upon the other trace-section.

The mode of connecting the two parts of the trace by means of my buckle is readily seen in Figs. 1, 2, and 3. In the modification shown in Fig. 5 instead of the clevis-shaped piece B, I use a T-shaped piece B', which has a tongue I' secured to the trace by means of pins or rivets through the holes J'. Instead of the recesses L there are provided holes L', adapted in the same way to receive the upper prongs of the forks H.

Having thus fully described my invention, what I claim, and desire to secure by Letters Patent, is—

In a trace-buckle, the combination of a buckle-frame consisting of side pieces joined at one end and in the middle, but open at the other end, the sides of said open end terminating in forks, said pieces joining the middle of said side pieces, having an upwardly-projecting stud, with an outer piece secured to the other trace-section and having recesses adapted to receive the upper prongs of the fork, and a downwardly-projecting cross-piece, substantially as described.

In testimony whereof I have signed this specification in the presence of two subscribing witnesses.

JACOB ZIEGLER.

Witnesses:
  W. C. WALTON,
  D. Z. MUMMERT.